March 18, 1924.

L. P. ROSS

VALVE

Filed Nov. 23, 1922

1,487,477

WITNESSES

INVENTOR
L. P. Ross,
BY
ATTORNEYS

Patented Mar. 18, 1924.

1,487,477

UNITED STATES PATENT OFFICE.

LORNE PRINGLE ROSS, OF SAN JOSE, COSTA RICA.

VALVE.

Application filed November 23, 1922. Serial No. 602,883.

*To all whom it may concern:*

Be it known that I, LORNE P. Ross, a citizen of the United Kingdom, and a resident of San Jose, Costa Rica, Central America, have invented certain new and useful Improvements in Valves, of which the following is a specification.

This invention relates in general to an improvement in valves, and more particularly to an improvement in float valves especially adapted for use with tanks or the like.

The object of the invention is to provide a float valve of this character in which the valve is held against its seat by the pressure of the fluid which it controls and which is at the same time of extremely simple and durable construction, compact and highly organized in assembly and easy and comparatively inexpensive to manufacture and which also possesses a wide range of adjustments whereby it is endowed with capacity for practically universal application.

Figure 1:
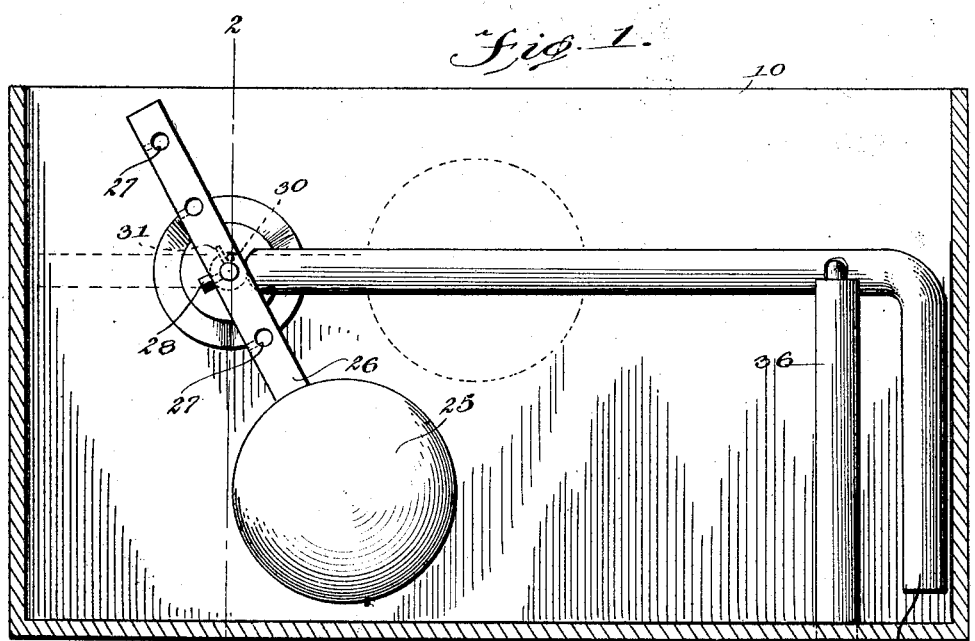
Figure 2:
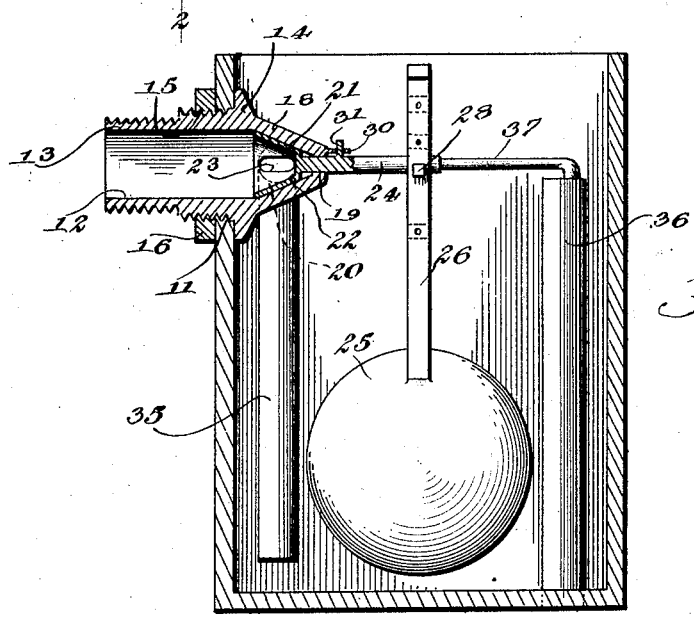

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a view in elevation, illustrating the preferred embodiment of the invention, the tank being shown in section; and Figure 2 is a view in section, taken approximately on line 2—2 of Figure 1.

Referring to the drawings wherein for the sake of illustration is shown the preferred embodiment of the invention, the numeral 10 designates a tank having in one of its walls an opening 11 in which a nipple 12 is arranged, the nipple 12 being externally threaded, as at 13 to facilitate its connection or coupling with the water supply system or the like. The nipple 12 is of special construction and includes an annular flange 14 arranged to abut the portion of the inner wall of the tank around the opening 11 and also includes an enlarged externally threaded portion 15 which extends exteriorly of the tank. A nut 16 is engaged with the externally threaded portion 15 and coacts with the flange 14 to hold the nipple in position. Suitable packing may be provided in between the nut 15 and the tank or between the flange 14 and the tank, if desired.

Adjacent the flange 14 a valve casing 18 is integrally formed with the nipple and preferably is of frusto-conical form, the outer end of the valve casing being apertured, as at 19, and the conical wall of the casing having an outlet 20 formed therein as shown in Figure 2. A valve 21 is operatively mounted in the valve casing 18 and comprises a shell of frusto-conical form closed at its inner end by a web 22, the shell operating against the frusto-conical wall of the casing 18 which like the shell is suitably machined and ground for this purpose. The frusto-conical shell which makes up the valve 21 is provided with a port 23 which is adapted to be brought into registry with the outlet 20 in certain positions of the valve. At such times the valve may be said to be open since the fluid flows through the same and at other times the valve is closed since flow of fluid is stopped. The web 22 which closes one end of the shell making up the valve 21 has suitably connected thereto or integrally formed therewith a valve stem 24 which extends through the aperture 19 into the tank.

A float 25 is arranged in the tank 10 and has connected thereto an arm 26 formed with a series of openings 27. The valve stem 24 is adapted to be selectively fitted in the openings 27 and the arm so fitted on the valve stem is releasably secured thereto by means of a set screw 28 having threaded connection with the arm and adapted to bear upon the valve stem 24.

The arrangement is such that when the float is in a nearly vertical position, as shown in full lines in Figure 1, the port 23 of the valve 21 is in full registration with the inlet opening 20 of the valve casing; whereas, when the float 25 is in horizontal position, as shown in dotted lines in Figure 1, the valve is closed, that is to say the port 23 is entirely out of registration with the opening 20. In order to prevent the float 25 from falling to position perpendicularly below the valve stem 24 and thus precluding operation of the float by the water in the tank, cooperating means is provided between the valve stem 24 and the valve casing 18 for limiting the downward movement of the float. Preferably this means comprises a pin 30 integral with or suitably secured with the valve casing 18 and extending horizontally therefrom and a cooperating pin 31 integrally formed with or suitably connected to the valve stem 24 and extending radially therefrom and so as to be engageable with the pin 30 when the float 25 has fallen to the position shown in full lines in Figure 1. Preferably the outlet 20 is connected to a pipe 35 which extends down to adjacent the bottom of the tank. The tank 10 is also provided with an overflow 36 and a small pipe 37 connects the pipe 35 to the overflow 36.

In operation the float 25 is constrained to operate within such limits as to always insure its actuation and control by the water in the tank 10 and the valve 21 is held against its seat by the pressure of the water and at the same time the float mechanism may be adapted for use with any water pressure by varying the connection of the arm 26 with the valve stem 24. The float controlled valve mechanism thus provided is strong, durable and reliable and yet at the same time compact and highly organized and provides for the proper control of the water without necessitating large installation cost and necessity for frequent repair or adjustment.

I claim:

In a float control valve mechanism, a nipple adapted to be coupled with the water supply system or the like, said nipple having a valve casing integrally formed therewith, said valve casing communicating with the nipple and being provided with a valve seat and with an outlet port in said valve seat, a valve operating on said seat, said valve having a stem projecting exteriorly of the valve casing, a float having an arm provided with a series of openings adapted to be selectively fitted on said valve stem, means for clamping the arm in adjusted position on the valve stem, and cooperating means between the arms and the valve casing for limiting the downward movement of the float.

LORNE PRINGLE ROSS.